(12) United States Patent
Kawaguchi et al.

(10) Patent No.: US 11,928,170 B2
(45) Date of Patent: Mar. 12, 2024

(54) INFORMATION OUTPUTTING APPARATUS, INFORMATION OUTPUTTING METHOD AND PROGRAM

(71) Applicant: Nippon Telegraph and Telephone Corporation, Tokyo (JP)

(72) Inventors: Ginga Kawaguchi, Musashino (JP); Kanako Sato, Musashino (JP); Hideki Ogawa, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 113 days.

(21) Appl. No.: 17/619,417

(22) PCT Filed: Jul. 1, 2019

(86) PCT No.: PCT/JP2019/026090
§ 371 (c)(1),
(2) Date: Dec. 15, 2021

(87) PCT Pub. No.: WO2021/001881
PCT Pub. Date: Jan. 7, 2021

(65) Prior Publication Data
US 2022/0327171 A1 Oct. 13, 2022

(51) Int. Cl.
*G06F 16/955* (2019.01)
*G06F 11/30* (2006.01)
*G06F 11/34* (2006.01)
*G06F 16/954* (2019.01)
*G06F 16/958* (2019.01)

(52) U.S. Cl.
CPC ........ *G06F 16/955* (2019.01); *G06F 11/3006* (2013.01); *G06F 11/3082* (2013.01); *G06F 11/3419* (2013.01); *G06F 16/954* (2019.01); *G06F 16/958* (2019.01)

(58) Field of Classification Search
CPC .......................... G06F 11/3419; G06F 16/958
See application file for complete search history.

(56) References Cited

U.S. PATENT DOCUMENTS

2006/0253345 A1* 11/2006 Heber .............. G06Q 10/06395
705/26.1
2008/0133500 A1* 6/2008 Edwards ............... G06F 16/958
707/999.005

(Continued)

OTHER PUBLICATIONS

[No Author Listed] [online], "Navigation Training," W3C, dated Dec. 17, 2012, retrieved from URL <https://www.w3.org/TR/navigation-timing/>, 17 pages.

(Continued)

*Primary Examiner* — Barbara B Anyan
(74) *Attorney, Agent, or Firm* — Fish & Richardson P.C.

(57) ABSTRACT

An information output apparatus that is able to communicate with a terminal used by a subject of an experiment for evaluating quality of experience related to utilization of a web browser includes: an output unit configured to output a value of designated information out of information related to processing executed by the web browser of the terminal in accordance with operations. Thus, it is possible to simply acquire information related to processing performed by the web browser in response to arbitrary operations.

3 Claims, 3 Drawing Sheets

(56) References Cited

U.S. PATENT DOCUMENTS

| | | | | |
|---|---|---|---|---|
| 2008/0133739 A1* | 6/2008 | Zuzga | ............... | G06F 11/3419 709/224 |
| 2008/0184116 A1* | 7/2008 | Error | .................. | G06F 16/955 715/704 |
| 2009/0193360 A1* | 7/2009 | Escuer | .................. | H04L 43/00 709/224 |
| 2013/0185643 A1* | 7/2013 | Greifeneder | ......... | H04L 67/535 715/736 |
| 2018/0011622 A1* | 1/2018 | Saragossi | ............. | G06F 40/143 |
| 2018/0039530 A1* | 2/2018 | Ciabarra, Jr. | ......... | G06F 11/006 |
| 2019/0171542 A1* | 6/2019 | Lackner | ............. | G06F 11/3006 |
| 2020/0073906 A1* | 3/2020 | Wang | ................. | G06F 11/3082 |

OTHER PUBLICATIONS

Furuhata, "HTML5 full-scale application development for Android-Improve efficiency with jQuery Mobile," Rick Telecom Co., Ltd., Apr. 23, 2012, 27 pages (with English Translation).

Sato et al., "Applicability Evaluation of QoE Estimation Model for Web-browsing," 2016 IEICE Communication Society Conference, Sep. 20, 2016, 3 pages (with English Translation).

* cited by examiner

INFORMATION OUTPUTTING APPARATUS, INFORMATION OUTPUTTING METHOD AND PROGRAM

CROSS-REFERENCE TO RELATED APPLICATIONS

This application is a National Stage application under 35 U.S.C. § 371 of International Application No. PCT/JP2019/026090, having an International Filing Date of Jul. 1, 2019. The disclosure of the prior application is considered part of the disclosure of this application, and is incorporated in its entirety into this application.

TECHNICAL FIELD

The present invention relates to an information output apparatus, an information output method, and a program.

BACKGROUND ART

In a user satisfaction level evaluation experiment for evaluating the quality of experience (QoE) and a satisfaction level of a user when using a web browser, various operations and actions of the user (subject) acting as a target of the experiment are recorded and analyzed. Here, the actions of the subject include which page has been browsed at what timing, and the various operations include active operations such as an operation for displaying the page and reloading the page.

Although in an experiment for evaluating the quality of experience and a satisfaction level at the time of using a web browser, it is possible to perform evaluation by degrading the browsing experience by a method of lowering a connecting line speed or the like (if the user has to wait too long, an action of actively performing a reloading operation, an action of moving on to viewing of another page, or the like occurs), how slow the web browser actually is significantly depends on individual pages or contents and is not always clear. It is thus necessary to quantitatively measure data regarding which page has been viewed at what timing and whether or not display has been quickly performed at the time of the viewing, in the actual evaluation experiment.

On the other hand, in terms of experiments for evaluating actions of subjects, it is desirable that the subjects use web browsers as usual in usage environments without feeling that something is wrong as far as possible. In particular, "usage of web browsers" includes a very wide range of utilization forms, and target contents/histories, browsing speeds, operating methods, and the like differ for individual users, and in order to evaluate "natural utilization methods" of general users as targets, it is desirable that the users use web browsers in as normal a manner as possible.

CITATION LIST

Non Patent Literature

Non Patent Literature 1: "Navigation Timing", [online], Internet <URL: https://www.w3.org/TR/navigation-timing/>

SUMMARY OF THE INVENTION

Technical Problem

As a method for acquiring browsing histories of subjects during experiments, there is a method of setting web browsers to use dedicated proxies and checking connection logs of the proxies. However, because URLs of https sites, as often used in recent years, are processed in encrypted connection in proxy logs, the URLs cannot be seen. It is thus necessary to use web browsers without using https, but it is difficult to place a requirement for this on the subjects of the evaluation experiments.

Thus, it is difficult to perform experiments for acquiring operation histories when "arbitrary general Internet contents are viewed", and instead, operation patterns (selecting/shifting specific pages) may be designated and regarded as operating tasks during the experiments.

Because the subjects do not have a motivation to perform the operations voluntarily, the experiment may partially deviate from an experiment purpose "to evaluate the quality of experience/a satisfaction level during utilization of a web browser".

Also, although in regard to "how quickly a web browser is displayed", it is appropriate to use the time information of the navigationStart/loadEventEnd of navigationTiming API of the web browser, and this is information that is accessible in the page content in the web browser, it is inherently not possible to acquire a result of the navigationTiming API in the aforementioned method of using a proxy.

The present invention was made in view of the aforementioned points, and an object thereof is to enable easy acquisition of information related to processing performed by a web browser in response to an arbitrary operation.

Means for Solving the Problem

In order to solve the aforementioned problem, an information output apparatus is an information output apparatus that is capable of communicating with a terminal used by a subject in an experiment for evaluating the quality of experience related to utilization of a web browser, the apparatus including: an output unit configured to output a value of designated information out of information related to processing executed by the web browser of the terminal in response to operations.

Effects of the Invention

It is possible to easily acquire information related to processing performed by a web browser in response to arbitrary operations.

DESCRIPTION OF EMBODIMENTS

Figure 1:
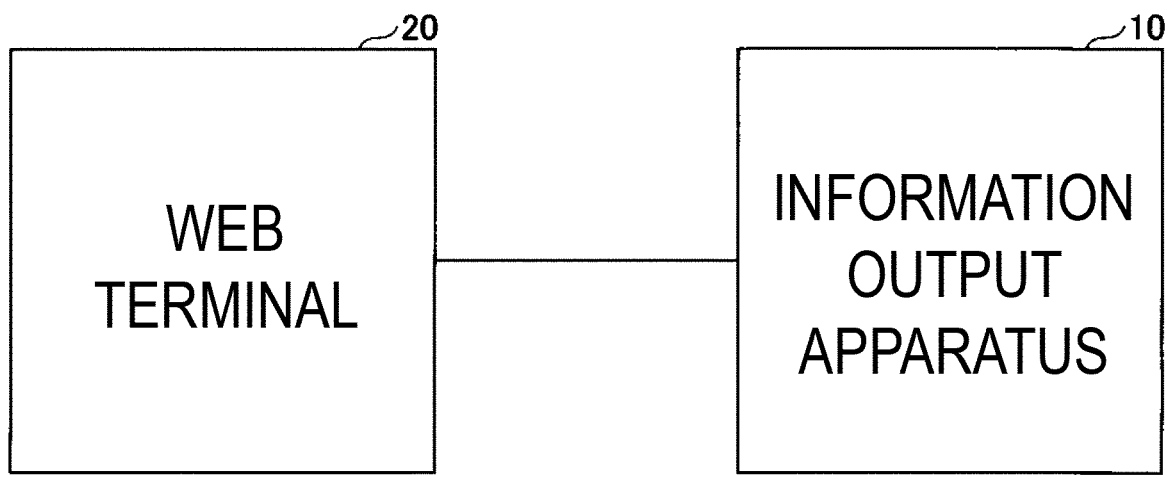
FIG. 1 is a diagram illustrating a system configuration example according to an embodiment of the present invention.

An embodiment of the present invention will be described below with reference to the drawings. In FIG. 1, a web terminal 20 and an information output apparatus 10 are connected with a universal serial bus (USB) cable or the like and can communicate with each other via the USB cable.

The web terminal 20 is a terminal provided with a web browser used by a subject of an experiment for evaluating a quality of experience (QoE) and a satisfaction level during utilization of the web browser. In the present embodiment, a smartphone is used as an example of the web terminal 20. For example, an OS of the web terminal 20 is Android (registered trademark), and the web browser included in the web terminal 20 is a Chrome browser for Android (registered trademark) version. The web terminal 20 can perform remote debugging using devtools installed on the Chrome browser of the information output apparatus 10 as a function of the Chrome browser of the Android (registered trademark) version. The web terminal 20 can record information related to processing executed by the web browser in response to operations through the remote debugging.

The information output apparatus 10 is a personal computer (PC) configured to output information related to processing executed by the web browser in response to an operation of the web browser performed by a subject using the web terminal 20.

Figure 2:
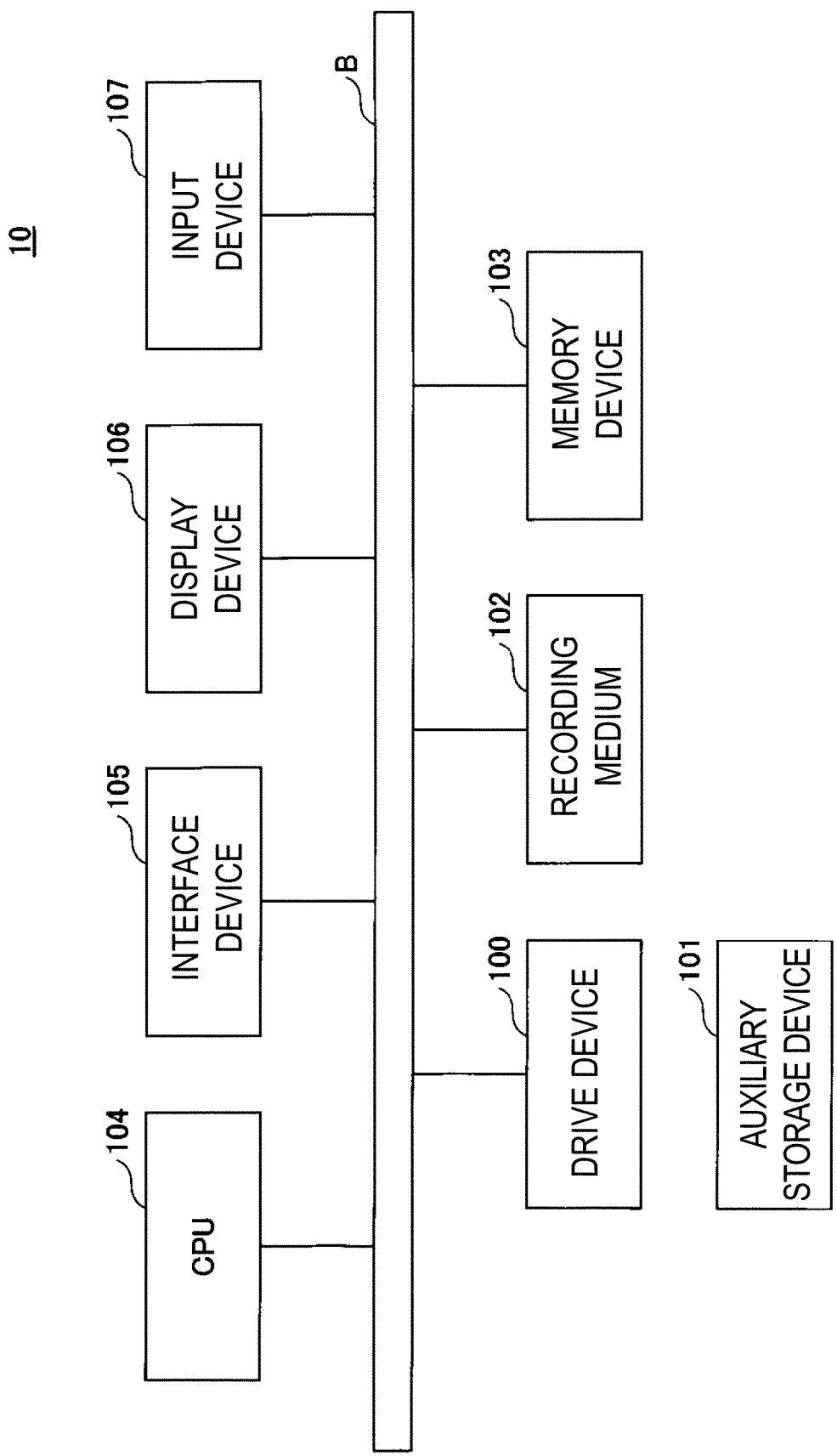
FIG. 2 is a diagram illustrating a hardware configuration example of an information output apparatus 10 according to the embodiment of the present invention.

FIG. 2 is a diagram illustrating a hardware configuration example of the information output apparatus 10 according to the embodiment of the present invention. An information output apparatus 1010 in FIG. 2 includes a drive device 100, an auxiliary storage device 102, a memory device 103, a CPU 104, an interface device 105, a display device 106, an input device 107, and the like, which are connected to each other via a bus B.

A program that realizes processing in the information output apparatus 1010 is provided by a recording medium 101 such as a CD-ROM. If the recording medium 101 storing a program is set in the drive device 100, then the program is installed in the auxiliary storage device 102 from the recording medium 101 through the drive device 100. However, the program is not necessarily installed by the recording medium 101 and may be downloaded from another computer through a network. The auxiliary storage device 102 stores the installed program and stores necessary files, data, and the like.

In a case in which an instruction for starting a program has been provided, the memory device 103 reads the program from the auxiliary storage device 102 and stores the program. The CPU 104 realizes a function related to the information output apparatus 1010 in accordance with the program stored in the memory device 103. The interface device 105 is used as an interface for connection to a network. The display device 106 displays a graphical user interface (GUI) or the like based on the program. The input device 107 is configured with a keyboard, a mouse, and the like and is used for inputting various operation instructions.

Figure 3:
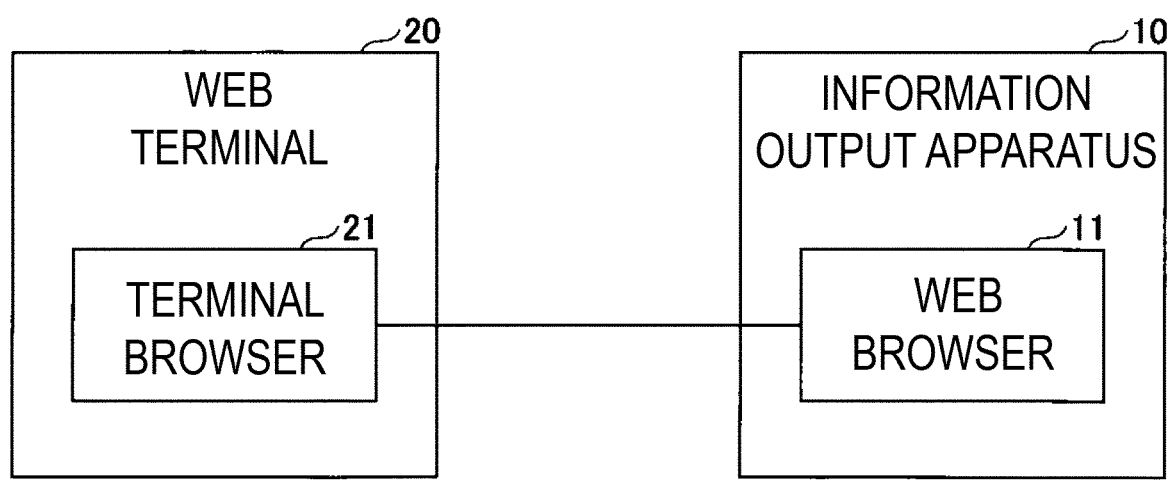
FIG. 3 is a diagram illustrating a functional configuration example of a web terminal 20 and the information output apparatus 10 according to the embodiment of the present invention.

FIG. 3 is a diagram illustrating a functional configuration example of the web terminal 20 and the information output apparatus 10 according to the embodiment of the present invention. In FIG. 3, the web terminal 20 has a terminal browser 21. The terminal browser 21 is realized by processing that one or more programs installed in the web terminal 20 cause a CPU or the like of the web terminal 20 to execute. On the other hand, the information output apparatus 10 has a web browser 11. The web browser 11 is realized by processing that one or more programs installed in the information output apparatus 10 cause the CPU 104 to execute.

The terminal browser 21 may be Google Chrome (registered trademark). The web browser 11 may also be Google Chrome (registered trademark).

Hereinafter, a processing procedure executed in the present embodiment will be described.

Here, a situation in which a subject uses the web terminal 20 in a state in which a USB debugging function is turned on in settings of the web terminal 20 is assumed. Note that the operation performed here assumes a purpose of an evaluation experiment, and it is assumed that the subject understands beforehand that an operation history and the like will be recorded.

The subject is in the same state as a situation in which the subject is performing browser operations normally other than that a USB cable is connected to the information output apparatus 10 and can view and operate web pages of arbitrary URLs at his/her own will. Thus, the subject is asked to freely act in regard to the viewing of and operating with web pages.

In the aforementioned situation, the experiment for evaluating the quality of experience (QoE) and a satisfaction level during utilization of the terminal browser 21 is performed. At this time, devtools included in the web browser 11 are used in order for the web browser 11 to acquire, through WebView, information related to processing executed by the terminal browser 21 in response to operations performed on the terminal browser 21.

The subject of the experiment (hereinafter, simply referred to as a "user") activates devtools on the web browser 11 of the information output apparatus 10 and selects, as a target, Remote Devices (that is, the terminal browser 21) (rather than the browser of itself (web browser 11)). As a result, the user can refer to a value of information designated by the user from the following NavigationTiming information in a console (hereinafter, referred to as a "console screen") for a display tab of the terminal browser 21 displayed in the web browser 11.

(1) "document. URL": viewing URL information
(2) "window.performance.timing.navigationStart": viewing start time (a time at which an instruction for displaying the web page (viewed page) as a viewing target is input)
(3) "window.performance.timing.loadEventEnd": a viewed page display completion time (a time at which display of the viewed page is completed)
(4) "window.performance.navigation.type": operation history information (whether or not the web browser is loading for the first time, whether the operation is a reloading operation or corresponds to utilization of a history, and the like).

In a case in which it is desired to refer to viewing URL information, for example, the user inputs "document.URL" to the console screen in a command input waiting state and presses a return key. Then, devtools of the web browser 11 acquire a uniform resource locator (URL) related to the web page currently displayed on the terminal browser 21 and output the URL to the console screen.

Similarly, the user inputs "window.performance.timing.navigationStart" or "window.performance.timing.loadEventEnd" to the console screen and presses the return key. Then, devtools of the web browser 11 acquire a viewing start time or a viewed page display completion time related to the web page currently displayed on the terminal browser 21 and output the time to the console screen.

The user can ascertain a time (display waiting time) required to display the viewed page by subtracting navigationStart (viewing start time) from loadEventEnd (viewed page display completion time). As a result, the user can ascertain and record the display waiting time of the terminal browser 21 of the web terminal 20 in the "experiment for evaluating the quality of experience (QoE) and a satisfaction level of the user" along with the information of the viewed page URL. In other words, it is possible to easily acquire the information related to the processing performed by the web browser in response to arbitrary operations. In this manner, it is possible to enable the evaluation of the quality of experience and a satisfaction level in arbitrary operations of the subject even in an environment via https sites and a proxy server.

Note that it is also considered that an operation of lowering a connecting line speed or the like to simulate "quality degradation" affects the web terminal 20 of the subject in the experiment for evaluating user's actions at the time of quality degradation.

Although there are also situations in which a display speed is lowered in an actual terminal and in which the display speed is changed in accordance with an operation state (if the display speed is set to be too slow, and the subject thus performs no operations at all, then the display speed recovers), and it is possible to perform such handling in regard to the operation of lowering the connecting line speed because it is possible to monitor operations of the subject in real time in the present invention.

Also, it is possible to quantitatively record the degree of influence of lowering the connecting speed and the like from the viewpoint of the subject by recording a history of the aforementioned information (1) to (4) and information indicating operation states of the subject, and to analyze a frequency of reloading operations and a page browsing pace in response to given environmental parameters (situations in which the connection speed is lowered) and further a relationship with data such as answers of an evaluator himself/herself regarding how good or poor the utilization experience was.

Also, it is possible to monitor an increase in waiting time in real time and thereby to dynamically perform adjustment of "lowering the connecting line speed" or the like in accordance with actual values of NavigationTiming of the web terminal 20 during the experiment (to increase the connecting line speed in a case in which the value of NavigationTiming is too low with respect to the connecting line speed set in advance).

Note that the web terminal 20 is an example of the terminal in the present embodiment. The web browser 11 is an example of the output unit.

Although the embodiment of the present invention has been described above in detail, the present invention is not limited to such a specific embodiment, and various modifications and changes can be made within the gist of the present invention described in the claims.

REFERENCE SIGNS LIST

10 Information output apparatus
11 Web browser
20 Web terminal
21 Terminal browser
100 Drive device
101 Recording medium
102 Auxiliary storage device
103 Memory device
104 CPU
105 Interface device
106 Display device
107 Input device
B Bus

The invention claimed is:

1. An information output apparatus comprising one or more processors configured to:
communicate with a terminal used by a subject of an experiment for evaluating quality of experience related to utilization of a web browser;
acquire, using a first command, a uniform resource locator (URL) of a web page displayed on the web browser of the terminal;
acquire, using a second command, a viewing start time at which an instruction for displaying the web page is input;
acquire, using a third command, a viewed page display completion time at which display of the web page is completed; and
output a value of designated information out of information i) related to processing executed by the web browser of the terminal in response to operations and ii) comprising the URL of the web page, the viewing start time, and the viewed page display completion time.

2. An information output method comprising:
communicating with a terminal used by a subject of an experiment for evaluating quality of experience related to utilization of a web browser;
acquiring, using a first command, a uniform resource locator (URL) of a web page displayed on the web browser of the terminal;
acquiring, using a second command, a viewing start time at which an instruction for displaying the web page is input;
acquiring, using a third command, a viewed page display completion time at which display of the web page is completed; and
outputting a value of designated information out of information i) related to processing executed by the web browser of the terminal in accordance with operations and ii) comprising the URL of the web page, the viewing start time, and the viewed page display completion time.

3. A non-transitory computer readable medium storing one or more instructions causing a computer to execute:
communicating with a terminal used by a subject of an experiment for evaluating quality of experience related to utilization of a web browser;
acquiring, using a first command, a uniform resource locator (URL) of a web page displayed on the web browser of the terminal;
acquiring, using a second command, a viewing start time at which an instruction for displaying the web page is input;
acquiring, using a third command, a viewed page display completion time at which display of the web page is completed; and
outputting a value of designated information out of information i) related to processing executed by the web browser of the terminal in accordance with operations and ii) comprising the URL of the web page, the viewing start time, and the viewed page display completion time.

* * * * *